US008204662B2

(12) United States Patent
Shoemaker

(10) Patent No.: US 8,204,662 B2

(45) Date of Patent: Jun. 19, 2012

(54) METHOD AND SYSTEM TO CONTROL ELECTRONIC THROTTLE SENSITIVITY

(75) Inventor: Joseph R. Shoemaker, West Burlington, IA (US)

(73) Assignee: CNH America LLC, New Holland, PA (US)

( * ) Notice: Subject to any disclaimer, the term of this patent is extended or adjusted under 35 U.S.C. 154(b) by 472 days.

(21) Appl. No.: 12/039,110

(22) Filed: Feb. 28, 2008

(65) Prior Publication Data

US 2009/0222183 A1 Sep. 3, 2009

(51) Int. Cl.
*G06F 7/70* (2006.01)
*G01V 3/00* (2006.01)

(52) U.S. Cl. ....................................... 701/70; 340/855.4

(58) Field of Classification Search .................... 701/70, 701/84, 30.4, 30.6, 30.7, 30.8, 30.9, 31.1; 340/855.4, 855.5, 855.7, 872.4
See application file for complete search history.

(56) References Cited

U.S. PATENT DOCUMENTS

| | | | |
|---|---|---|---|
| 4,470,396 A | 9/1984 | Hasumi et al. | |
| 4,515,126 A | 5/1985 | Kessler | |
| 4,569,320 A | 2/1986 | Collonia | |
| 4,573,319 A * | 3/1986 | Chichester | 60/422 |
| 5,383,431 A | 1/1995 | Nishimura et al. | |
| 5,775,293 A | 7/1998 | Kresse | |
| 5,960,969 A * | 10/1999 | Habisohn | 212/275 |
| 6,157,888 A | 12/2000 | Suzio et al. | |
| 6,397,816 B1 | 6/2002 | Pursifull | |
| 6,526,342 B1 * | 2/2003 | Burdock et al. | 701/37 |
| 6,574,542 B1 | 6/2003 | Kurtzberg et al. | |
| 6,672,282 B2 | 1/2004 | Harrison et al. | |
| 6,718,255 B1 | 4/2004 | Okubo | |
| 6,718,943 B1 | 4/2004 | De La Salle et al. | |
| 2002/0043242 A1 * | 4/2002 | Ikeda et al. | 123/396 |
| 2005/0216134 A1 | 9/2005 | Katrak | |
| 2006/0154537 A1 | 7/2006 | Mizushima | |
| 2007/0055836 A1 * | 3/2007 | Yamato et al. | 711/162 |

FOREIGN PATENT DOCUMENTS

| | | |
|---|---|---|
| DE | 3512473 | 10/1985 |

* cited by examiner

*Primary Examiner* — James Trammell
*Assistant Examiner* — Muhammad Shafi
(74) *Attorney, Agent, or Firm* — Patrick M. Sheldrake

(57) ABSTRACT

An electronic throttle control system for a motorized vehicle includes a sensor providing a signal corresponding to a relative position of an accelerator pedal between an undepressed position and a fully depressed position at a first predetermined time interval. A memory device is provided for storing a plurality of provided signals. A controller is provided for averaging a predetermined number of provided signals and sending the averaged signal to the motor at a second predetermined time interval for modulating operating speed of the motor. Upon the memory device storing the predetermined number of provided signals, provided signals are discarded from the memory device on a first in, first out basis.

13 Claims, 4 Drawing Sheets

METHOD AND SYSTEM TO CONTROL ELECTRONIC THROTTLE SENSITIVITY

FIELD OF THE INVENTION

The present invention relates generally to the field of vehicles. It relates more particularly to vehicles having electronic throttle control.

BACKGROUND OF THE INVENTION

Typically, the velocity and acceleration of a motorized vehicle is controlled by the position of a throttle or acceleration pedal operated by the driver's foot, and by the rate of change of the throttle or acceleration pedal position. In certain vehicles, particularly in those with electronically controlled diesel engines, drivers typically consider the exhibited throttle or acceleration pedal response too sensitive during small throttle or acceleration pedal changes. Related throttle sensitivity problems are particularly pronounced in vehicles with high horsepower-to-weight ratios (e.g., pick-up trucks), but may also be especially problematic for large vehicles driving over uneven terrain. Uneven or rough terrain typically compounds problems associated with throttle or acceleration pedal sensitivity, as unanticipated jolts may similarly result in inadvertent shifting of the driver's foot position modulating the throttle or acceleration pedal.

Generally, it is undesirable for a small change in throttle or acceleration pedal position to result in a large change in vehicle speed or acceleration. For example, a driver wishing to increase the vehicle speed slightly will depress the throttle or acceleration pedal slightly, and will be startled if the engine produces a large amount of acceleration. The unanticipated acceleration will typically cause the driver to immediately and excessively "back off" of the throttle or acceleration pedal, which in turn excessively slows the vehicle. The driver then depresses the throttle or acceleration pedal, endlessly repeating a cycle of exaggerated movement of the throttle or acceleration pedal and resulting exaggerated vehicle acceleration/deceleration. This cycle is commonly referred to as "driver-induced oscillation". Similarly, while driving over uneven or rough terrain, the motion imparted to the vehicle by the uneven or rough terrain may cause the driver to unintentionally depress the accelerator pedal by a small amount. Under these circumstances, it would be undesirable for the velocity and/or acceleration of the vehicle to increase dramatically.

Systems known in the art to address throttle sensitivity typically include a plurality of sensing devices and filters involving complicated feedback algorithms that add complexity and cost to a vehicle.

Accordingly, there is a need for a system and method that reduces throttle or acceleration pedal sensitivity which is uncomplicated and inexpensive to incorporate into a vehicle. There is a further need for a system and method that permits the driver to modify the throttle or acceleration pedal sensitivity.

SUMMARY OF THE INVENTION

The present invention relates to an electronic throttle control system for a motorized vehicle including a sensor providing a signal corresponding to a relative position of an accelerator pedal between an undepressed position and a fully depressed position at a first predetermined time interval. A memory device is provided for storing a plurality of provided signals. A controller is provided for averaging a predetermined number of provided signals and sending the averaged signal to the motor at a second predetermined time interval for modulating operating speed of the motor. Upon the memory device storing the predetermined number of provided signals, provided signals are discarded from the memory device on a first in, first out basis.

The present invention further relates to a method for controlling an electronic throttle for a motorized vehicle. The method includes continuously sampling a signal corresponding to a relative position of an accelerator pedal between an undepressed position and a fully depressed position at each first predetermined time interval. The method further includes storing the sampled signals and calculating an average signal based on a predetermined number of the sampled signals. The method further includes sending the averaged signal to the motor for modulating operating speed of the motor and discarding stored sampled signals on a first in, first out basis upon the number of stored sampled signals exceeding the predetermined number of sampled signals.

An advantage of the present invention is a system and method for throttle sensitivity that is uncomplicated in operation and inexpensive to manufacture.

A further advantage of the present invention is a system and method for throttle sensitivity which is modifiable by the driver.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention includes a process, referring to FIGS. 1-4 for controlling an electronic throttle for a motorized vehicle (not shown). With the exception of memory device 70 shown in both FIGS. 2 and 3, components of a system for controlling an electronic throttle 80 of an engine for a motorized vehicle are not shown in detail, and are not required to be shown in detail for one having ordinary skill in the art to practice the invention.

The terms throttle pedal and accelerator pedal are intended to be used interchangeably.

Figure 1:
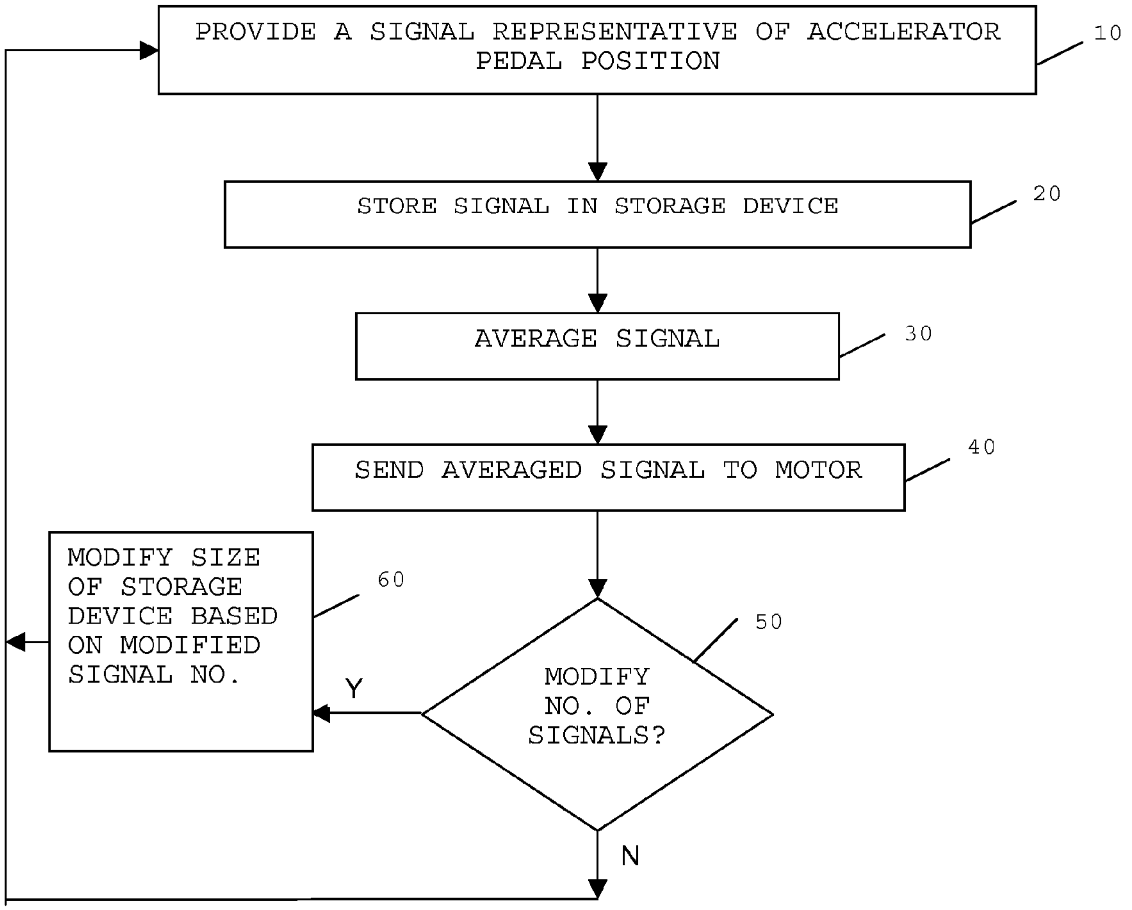
FIG. 1 is a diagram corresponding with the operation of the system of the present invention.
Figure 3:
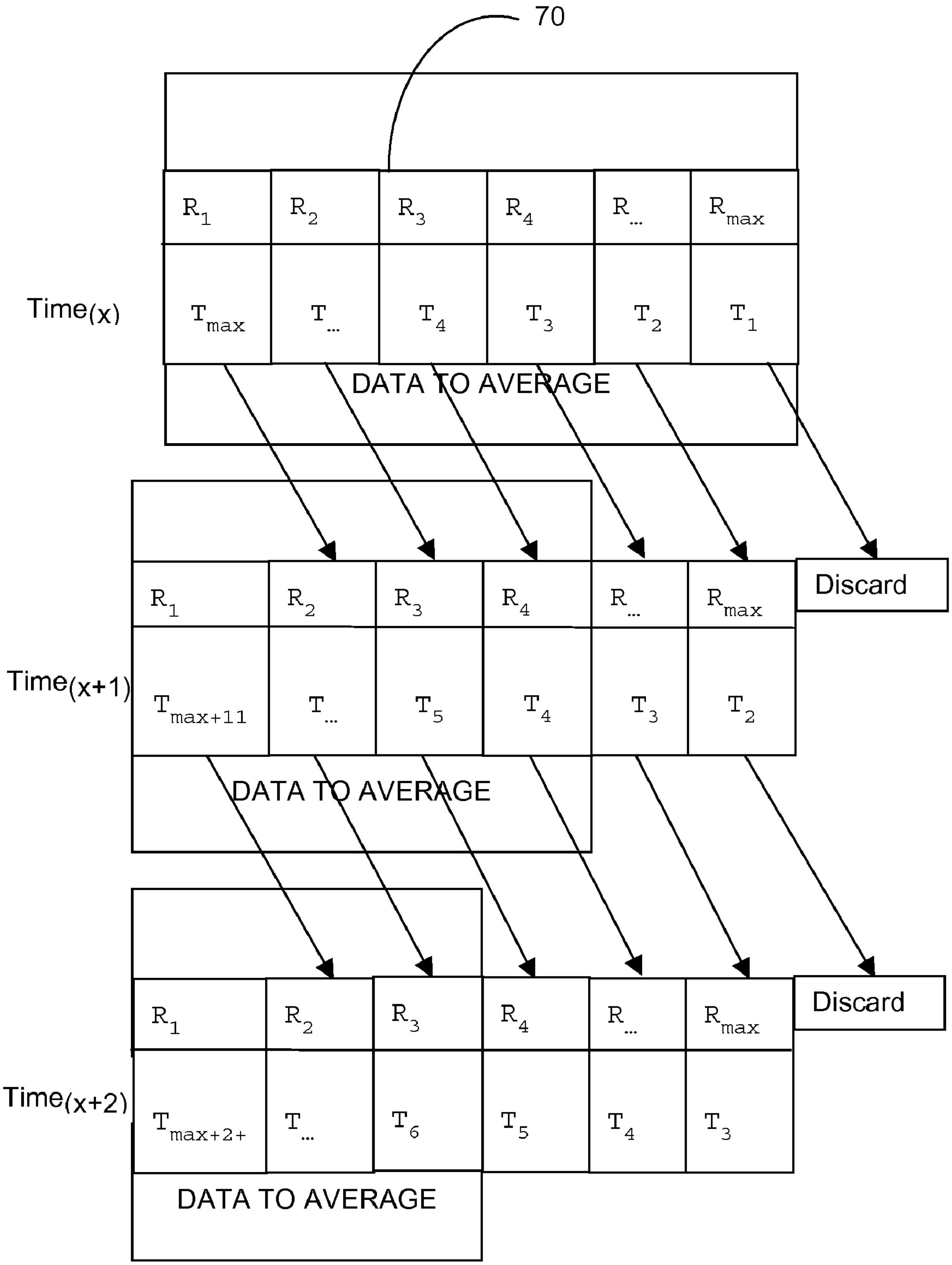
FIG. 3 is a diagram of an alternate embodiment of data collection of the system of the present invention.
Figure 4:
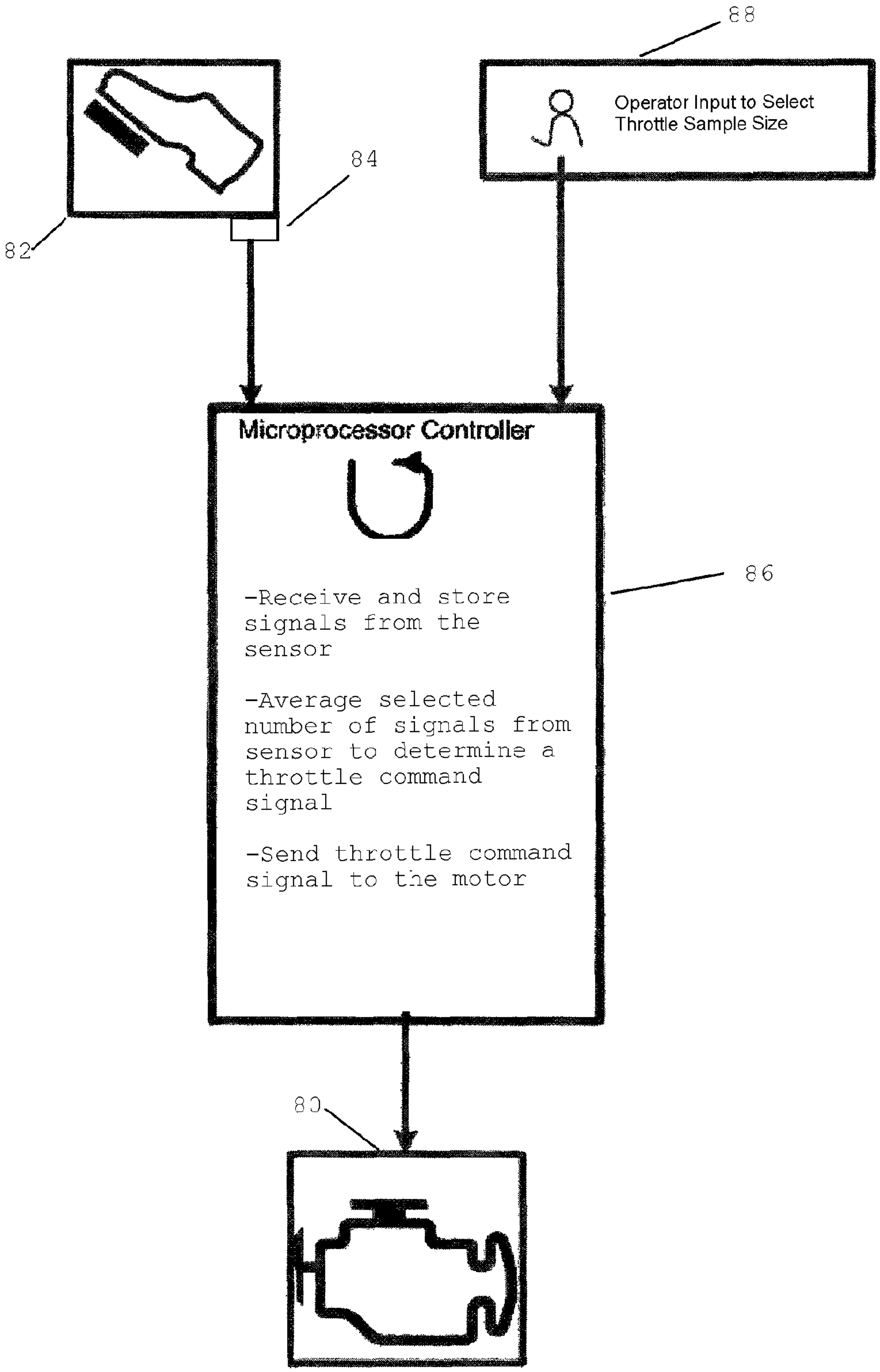
FIG. 4 is a schematic diagram of an embodiment of the system of the present invention.

Referring to FIGS. 1 and 4, a sensor 84 that is provided in step 10 is configured to provide a signal representative of an position of an accelerator pedal 82. In one embodiment, the signal is a voltage, although other ways may be used to represent the accelerator pedal position electronically. For example, the sensor 84 may provide the signal over a communication bus, such as a CANBus, which would occur via a network connection, and is not a voltage. Using a five volt throttle system, for example, a position of the accelerator pedal depressed to a position equally spaced between an undepressed position and a fully depressed position would represent a 2.5 volt signal. A controller 86 or other device controlled by a microprocessor stores the signal $T_i$ where i=1 through a maximum (max) number in a storage register ($R_i$) arranged in a sequence reversed from each other in step 20 in a memory device 70 (FIGS. 2 and 3) at a predetermined time interval, such as about 10 milliseconds. However, in alternate embodiments, the predetermined time interval may vary, such as between about 5 milliseconds to about 500 milliseconds in any combination of increments greater than, equal to or less than 1 millisecond, if desired. For example, in one embodiment, the predetermined time interval may vary between about 5 milliseconds to about 50 milliseconds. In an alternate embodiment, the predetermined time interval may be about 10 milliseconds.

While the exemplary embodiment is microprocessor controlled, the present invention may be practiced by other suitable and/or compatible equipment constructions that do not include a microprocessor.

Figure 2:
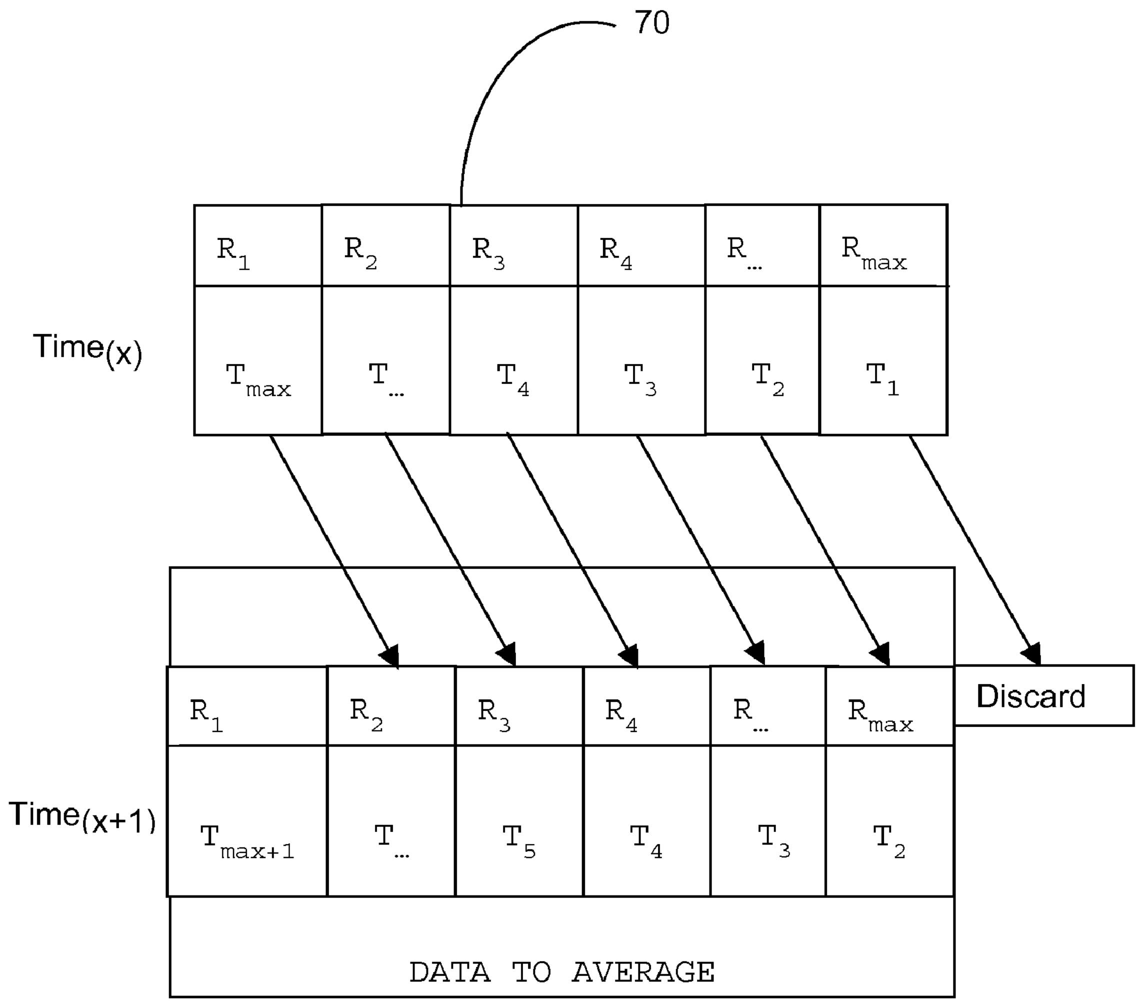
FIG. 2 is a diagram of an embodiment of data collection of the system of the present invention.

FIG. 1 further shows the signal being averaged in step 30. FIG. 2 shows one embodiment in which signal averaging is achieved. Storage device 70 is configured to average a predetermined number of signals. As shown for an instant of time referred to as $Time_{(x)}$, signals have been stored in memory locations or registers of storage device 70 corresponding from $T_1$ to $T_{max}$. For example, at a first predetermined time interval, the signal $T_1$ is stored in register $R_1$. At a second predetermined time interval, the signal $T_1$ provided at the first predetermined time interval and previously stored in register $R_1$ is shifted to register $R_2$, with the signal $T_2$ provided at the second predetermined time interval being stored in register $R_1$. It is appreciated that for each subsequent predetermined time interval the previously provided signals are each shifted to the next larger incremented or sequenced register, with the newly provided signal being stored in register $R_1$. At $Time_{(x)}$, a signal $T_i$ is stored in each of the memory registers $R_i$ of storage device 70, with the signal stored in register $R_{max}$ corresponding to the signal $T_1$ provided at the first predetermined time interval, and the signal $T_{max}$, corresponding to the most recently completed predetermined time interval, i.e., the most recently sampled signal, stored in register $R_1$.

As further shown in FIG. 2, at time instant $Time_{(x+1)}$, a newly provided signal $T_{max+1}$ is stored in register $R_1$, with each previously stored signal $T_i$ being shifted to the next larger incremented or sequenced register $R_i$. However, since each of the registers $R_i$ already contains a signal $T_i$, the signal $T_1$ provided at the first predetermined time and stored in $R_{max}$ at time instant $Time_{(x)}$ is discarded at time instant $Time_{(x+1)}$. The average of the signals at time instant $Time_{(x+1)}$, as shown in step 30 in FIG. 1, is the sum of the signals stored in registers $R_1$ through $R_{max}$ divided by the value (max) (shown as the subscript in $T_{max}$ in FIG. 2). The value (max) corresponds to the predetermined number of memory registers available for use in memory device 70. Therefore, the averaged signal at time instant $Time_{(x+1)}$ would not include the contribution of signal $T_1$ provided at the first predetermined time. In this way, the effect of an atypical signal, i.e., one significantly larger or smaller than other signals, is only temporary, and due to the atypical signal being averaged with other signals, the effect of the atypical signal is mitigated.

As shown in step 40 in FIG. 1, corresponding to a predetermined time interval, such as about 50 milliseconds, the previously averaged signal in step 30 is sent to the motor (not shown) to modulate the operating speed of the motor. For example and ease of discussion, if the averaged signal of a five volt throttle system is 2.5 volts, the speed of the motor would be modulated at an operating speed that is one half of the sum of the idle speed and a maximum speed of the motor. In alternate embodiments, the predetermined time interval may vary from 50 milliseconds, such as between about 10 milliseconds to about 100 milliseconds in any combination of increments greater than, equal to or less than 1 millisecond, if desired. For example, in one embodiment, the predetermined time interval may vary between about 5 milliseconds to about 50 milliseconds. In an alternate embodiment, the predetermined time interval may be about 20 milliseconds As shown in step 50 of FIG. 1, which is an optional step, the driver may modify the number of signals that are averaged. It is appreciated that increasing the number of signals to be averaged would decrease the throttle control sensitivity, while decreasing the number of signals to be averaged would increase the throttle control sensitivity. In other words, the driver has the opportunity to modify the "feel" of the throttle in a manner more suitable to the driver. It is to be understood that while throttle sensitivity as a general matter may differ between drivers, throttle sensitivity may also differ for the same driver, depending upon application. That is, a driver may desire increased throttle sensitivity in a work vehicle, such as a loader, while loading and unloading in close quarters is performed. However, the driver may desire decreased throttle sensitivity while transporting the work vehicle to another work site located miles away.

As shown in step 60 of FIG. 1, which is associated with optional step 50, the size or number of registers of storage device 70 (FIG. 3) is modified, based on the driver's preference. For example, as further shown in FIG. 3, at time instant $Time_{(x)}$, a predetermined number of memory registers corresponds to the value (max) (shown as the subscript in $T_{max}$ in FIG. 3). The value (max) corresponds to the predetermined number of memory registers available for use in memory device 70 as previously discussed. However, between time instant $Time_{(x)}$ and time instant $Time_{(x+1)}$, the driver indicates a preference via an input device 88 shown in FIG. 4 to modify the number of memory registers in memory device 70 to four.

Therefore, while there may be signal values stored in each of memory registers $R_1$ through $R_{max}$ at time instant $Time_{(x+1)}$, the averaged signal would be calculated to be the sum of the signal values in memory registers $R_1$ through $R_4$, i.e., signals $T_{max+1}$, T . . . , $T_5$ and $T_4$, divided by four. It is appreciated that that in this example the signals to be averaged are the four most recently sampled.

As further shown in FIG. 1, after completion of steps 50 and 60, control of the process is returned to step 10 to repeat the process.

Similarly, as further shown in FIG. 3, between time instant $Time_{(x+1)}$ and time instant $Time_{(x+2)}$, the driver indicates a preference via an input device (not shown) to modify the number of memory registers in memory device 70 to three. Therefore, while there may be signal values stored in each of memory registers $R_1$ through $R_{max}$ at time instant $Time_{(x+2)}$ as previously discussed, the averaged signal would be calculated to be the sum of the signal values in memory registers $R_1$ through $R_3$, i.e., signals $T_{max+2}$, T . . . and $T_6$, divided by three. It is appreciated that in this example the signals to be averaged are the three most recently sampled.

It is to be understood that in an alternate embodiment, signals may be non-sequentially stored, and thus, also be non-sequentially discarded in the memory device.

In an alternate embodiment, the input device (not shown) may be configured differently, such as a dial construction, providing three different signal number value selections identified, for example, as High, Medium and Low sensitivity. That is, with the High sensitivity selection, the number of signals that are to be averaged may be, for example, seven. Similarly, with the Medium sensitivity selection, the number of signals that are to be averaged may be, for example, fourteen. Finally, with the Low sensitivity selection, the number of signals that are to be averaged may be, for example, twenty. Providing such a selectable input device simplifies the level of input from the driver, in that the driver is not required to know the range of signals as a basis for modification. In an alternate embodiment, buttons such as "Increased Throttle Sensitivity" or "Decreased Throttle Sensitivity" or an appropriate graphical representation may be used to similarly increase or decrease the number of signals that are averaged. These buttons may be selectively depressed to gradually modify the throttle sensitivity to comport with the driver's preferences.

It is to be understood that the order of steps in FIG. 1 may be altered. For example, the magnitudes of predetermined time intervals associated with providing signals and with sending the averaged signals, could alter the sequence of steps in FIG. 1.

It is to be understood that the predetermined time interval associated with providing signals representative of the accelerator position, the predetermined time interval associated with providing averaged signals to the motor, as well as the number of averaged signals that are provided to the motor are related to the application of use. That is, the size, weight, and wheelbase dimensions of the vehicle in question, as well as the magnitude of unevenness or roughness of the terrain and maximum speed of the vehicle must be taken into account. For example, vehicles capable of operating at extremely high speeds may require further reduced predetermined time intervals. In an alternate embodiment, the process may provide modification of predetermined time intervals associated with monitoring accelerator pedal position and/or sending the averaged signal to the motor.

The process of the present invention should have little, if any, practical effect during start-up of the vehicle, in that sampling and collecting (storing) of signals or signal values corresponding to the relative position of an accelerator pedal typically begin as soon as the operator rotates the ignition key to the "on" position. Typically, the memory registers would already be filled, and older signal values discarded prior to the engine start-up. However, even if virtual instantaneous starting were possible with the accelerator pedal in an undepressed position, the undepressed position still corresponds to the engine idle speed, until the driver were to depress the accelerator pedal.

Control algorithm(s) can be computer programs or software stored in the non-volatile memory of the controller and can include a series of instructions executable by the microprocessor of the controller. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the controller can be changed to incorporate the necessary components and to remove any components that may no longer be required.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electronic throttle control system for a motorized vehicle comprising:

a sensor providing a signal corresponding to a relative position of an accelerator pedal between an undepressed position and a fully depressed position at a first predetermined time interval;

a memory device for storing a plurality of provided signals from the sensor;

a controller configured to determine a motor control signal as a function of a predetermined quantity of provided signals stored in the memory device and to send the motor control signal to the motor at a second predetermined time interval for modulating operating speed of the motor wherein the predetermined quantity of stored signals used in the determination of the motor control signal is modifiable by an operator input such that either additional or fewer stored signals are used by the controller in determining the motor control speed for adjusting throttle sensitivity, wherein the predetermined quantity of signals from the sensor are averaged by the controller to calculate the motor control signal; and the memory device configured upon storing the predetermined number of provided signals, to discard an older signal from the memory device and replace the older signal with a more recent signal.

2. The control system of claim 1, wherein the predetermined number of signals averaged can be increased and decreased while the vehicle is operating.

3. The control system of claim 1, wherein the operator input is configured to provide a selectable plurality of signal number values for an operator to chose the predetermined number of signals and the quality of stored signals corresponding to positions of the pedal is at least two.

4. The control system of claim 3, wherein the selectable plurality of signal number values correspond to sensitivity settings of the throttle, wherein a high sensitivity setting corresponds to a first predetermined number and a low sensitivity setting corresponding to a second predetermined number having a value higher than the first predetermined number, wherein the sensitivity of the throttle corresponds to the effect of each signal reading from the sensor on the calculated motor control signal.

5. The control system of claim 1, wherein the memory device has a plurality of storage locations, each storage location configured to store a signal representing a position of the pedal, the controller configured to store a new signal in one of the storage locations of the memory device after the passage of the first predetermined time interval, wherein as the new signal is stored in a storage location the oldest signal value at the time is deleted from the memory, the controller configured to average signals from a selected predetermined number of storage locations such that each motor control signal is determined as a function of at least two signals from the sensor and the operator input determines the predetermined number of storage locations from which the controller calculates the motor control signal using stored signals therefrom.

6. The control system of claim 1, wherein the first predetermined time interval is between about 5 milliseconds to about 500 milliseconds.

7. The control system of claim 6, wherein the first predetermined time interval is between about 5 milliseconds to about 50 milliseconds.

8. The control system of claim 7, wherein the first predetermined time interval is about 10 milliseconds.

9. The control system of claim 1, wherein the second predetermined time interval is between about 10 milliseconds to about 500 milliseconds.

10. The control system of claim 9, wherein the second predetermined time interval is between about 15 milliseconds to about 100 milliseconds.

11. The control system of claim 9, wherein the second predetermined time interval is about 20 milliseconds.

12. The control system of claim 1, wherein the memory device sequentially stores the plurality of provided signals.

13. The control system of claim 1, wherein the predetermined number of signals is between about 3 and about 25.

* * * * *